(12) United States Patent
Dor et al.

(10) Patent No.: US 8,286,149 B2
(45) Date of Patent: Oct. 9, 2012

(54) APPARATUS FOR AND METHOD OF IMPLEMENTING FEEDBACK DIRECTED DEPENDENCY ANALYSIS OF SOFTWARE APPLICATIONS

(75) Inventors: Nurit Dor, Ranana (IL); Yishai Abraham Feldman, Tel Aviv (IL); Inbal Ronen, Haifa (IL); Sara Porat, Ramat Yishay (IL)

(73) Assignee: International Business Machines Corporation, Armonk, NY (US)

( * ) Notice: Subject to any disclaimer, the term of this patent is extended or adjusted under 35 U.S.C. 154(b) by 990 days.

(21) Appl. No.: 11/872,045

(22) Filed: Oct. 15, 2007

(65) Prior Publication Data
US 2009/0100415 A1    Apr. 16, 2009

(51) Int. Cl.
*G06F 9/45*    (2006.01)
(52) U.S. Cl. ......... 717/141; 717/143; 717/144; 717/151
(58) Field of Classification Search .................. None
See application file for complete search history.

(56) References Cited

U.S. PATENT DOCUMENTS

| | | | | |
|---|---|---|---|---|
| 5,673,387 | A * | 9/1997 | Chen et al. .................. | 714/38.1 |
| 7,506,329 | B1 * | 3/2009 | Boucher ...................... | 717/151 |
| 7,568,197 | B1 * | 7/2009 | Kiick et al. .................. | 718/100 |
| 7,627,861 | B2 * | 12/2009 | Smith et al. .................. | 717/144 |
| 7,661,097 | B2 * | 2/2010 | Mukkavilli .................... | 717/143 |
| 7,730,469 | B1 * | 6/2010 | Boucher ...................... | 717/151 |
| 2003/0028864 | A1 * | 2/2003 | Bowen ......................... | 717/141 |
| 2005/0081106 | A1 * | 4/2005 | Chang et al. ................. | 717/124 |
| 2005/0165823 | A1 * | 7/2005 | Ondrusek et al. ............. | 707/102 |
| 2006/0101435 | A1 | 5/2006 | Akilov et al. | |
| 2006/0117306 | A1 * | 6/2006 | Kimura et al. ................ | 717/141 |
| 2006/0253739 | A1 | 11/2006 | Godefroid et al. | |
| 2008/0148245 | A1 * | 6/2008 | Gutz ............................. | 717/141 |
| 2010/0169870 | A1 * | 7/2010 | Dice ............................ | 717/141 |

FOREIGN PATENT DOCUMENTS
JP    2002278792    9/2002

OTHER PUBLICATIONS

Law et al., Whole program Path-Based dynamic impact analysis, May 2003, 11 pages, <http://delivery.acm.org/10.1145/780000/776854/p308-law.pdf>.*

(Continued)

*Primary Examiner* — Thuy Dao
(74) *Attorney, Agent, or Firm* — Howie Zaretsky; Woods Oviatt Gilman LLP.

(57) ABSTRACT

A novel and useful mechanism for optimizing the detection of dependencies in a software system via feedback between static and dynamic engines. The present invention enables dynamic analysis to be more effective by using the results of static analysis to identify sections that need to be traced during dynamic analysis. The method also increases the accuracy of static analysis by using dynamic values as inputs to static analysis. Dynamic values used as inputs for static analysis are a result of dynamic analysis. The mechanism first executes a static analysis, then executes a dynamic analysis targeting the sections identified by the static analysis and finally executes a static analysis using the dynamic values identified during the dynamic analysis in order to detect dependencies. The present invention also provides a mechanism to analyze a specific section of a software system by first executing a dynamic analysis targeting the specific section and then executing a static analysis using the dynamic values identified during the dynamic analysis.

25 Claims, 7 Drawing Sheets

OTHER PUBLICATIONS

Singer et al., Dynamic analysis of program concepts in Java, Aug. 2006, 9 pages, <http://delivery.acm.org/10.1145/1170000/1168060/p31-singer.pdf>.*

Brown et al., AWE: improving software analysis through modular integration of static and dynamic analyses, Jun. 2007, 6 pages, <http://delivery.acm.org/10.1145/1260000/1251547/p69-brown.pdf>.*

F. Ohata et al, "A slicing method for object-oriented programs using lightweight dynamic information", Proc. Eighth Asia-Pacific Software Engineering Conference, 2001, 273-80.

Y. Ashida et al., "Slicing methods using static and dynamic analysis information", Proceedings Sixth Asia Pacific Software Engineering Conference (ASPEC'99) (Cat. No. PR00509), 1999, 344-50.

Dirk Heuzeroth et al., "Generating Design Pattern Detectors from Pattern Specifications", Proceedings of the 18th IEEE International Conference on Automated Software Engineering (ASE'03), 2003.

Dirk Heuzeroth et al., "Combining Static and Dynamic Analyses to Detect Interaction Patterns", IDPT, Pasadena, CA, 2002.

T. Eisenbarth et al, "Locating Features in Source Code", 2003 (http://www.iste.uni-stuttgart.de/ps/bauhaus/papers/tse2003.ps.

M. Mock et al., "Improving Program Slicing with Dynamic Points-to-Data", 2002, http://portal.acm.org/citation.cfm?id=587051.587062&dl=GUIDE&dl=ACM&type=series&idx=SERIES364&part=Proceedings&WantType=Proceedings&title=Foundations%20of%20Software%20Engineering.

I. Ronen et al., "Combined Static and dynamic Analysis for Inferring Program Dependencies Using a Pattern Language", CASCON '06, 2006 http://portal.acm.org/citation.cfm?id=1188970&dl=&coll=&CFID=15151515&CFTOKEN=6184618.

J-D Choi, "Techniques for Debugging Parallel Programs with Flowback Analysis", ACM Transactions on Programming Languages and Systems, Vo. 13, No. 4, Oct. 1991, 491-530.

* cited by examiner

LISTING 1: EXAMPLE APPLICATION

```
public PatentTest(boolean shouldConnect, String dbName)
{
        String sql = "SELECT X from T";
        if (shouldConnect)
        {
                Connection con = getConnectionForName(dbName);
                Statement st = con.createStatement();
                st.execute(sql);
        }
}

Public Connection getConnectionForName(String dbName)
{
        Return DriverManager.getConnection(dbName);
} public static void main(String[] args)
{
        String dbName = readPropertyFromFile("db.url");
        boolean shouldConnect = parseArgs(args);
        new PatentTest(shouldConnect, dbName);
}
```

APPARATUS FOR AND METHOD OF IMPLEMENTING FEEDBACK DIRECTED DEPENDENCY ANALYSIS OF SOFTWARE APPLICATIONS

FIELD OF THE INVENTION

The present invention relates to the field of change management and impact analysis, namely the identification of code sections that will be affected as a result of a change request, and more particularly relates to an apparatus and method of the automatic detection of dependencies between software pieces, including dependencies between code segments within a particular application, as well as dependencies of code segments on the surrounding middleware and data stores.

BACKGROUND OF THE INVENTION

As software systems increase in complexity and the existing inventory of legacy code continues to be integrated into current systems, identifying the impact of change management requests is becoming more complex and time consuming. Some of the legacy code still in use has insufficient or inadequate documentation. This increasingly becomes a reliability issue as legacy code is still being incorporated into modern systems.

Traditional analysis of software systems includes both static and dynamic analysis. Static analysis analyzes the code for dependencies without relying on any external resources or dynamic events. Dynamic analysis on the other hand, focuses on how the system reacts to external inputs, for example user input from a keyboard or other input device. Another facet of dynamic analysis is testing how the system behaves when interacting with external files such as databases.

As an example, consider that Structured Query Language (SQL) queries in modern programming languages such as Visual Basic, Java, C++ and C# are computed dynamically at run-time as strings, which are then sent to the database for execution. These strings contain the names of databases, tables, and fields and can come from external sources such as user input, configuration files, or databases. Therefore it is impossible to discover these names solely by static analysis, since the data dependencies between the program and database component cannot be discovered. Other examples of external data accessed by software applications include files, CICS transactions, etc.

Other examples include heavily customizable applications such as SAP's enterprise resource planning (ERP) software application. SAP's ERP is a single application that depends on a great deal of information from various configuration tables, typically stored in an external database. The control-flow of the application is heavily dependent on the configuration data, which is external to the application itself. Configuration is accomplished via numerous "if" statements in the application, which refer to values in the external configuration data. The configuration data can also include references to external data sources such as databases. Without access to dynamic information, static analysis must assume all possible values, which (if the analysis is conservative) will cause it to report many false dependencies. Furthermore, in the case of infinite domains (such as names of databases, files, or transactions), static analysis will be unable to report any result.

Some dependencies may occur in every execution of the application, while others may only happen on certain executions, depending on user input, external data and the non-deterministic nature of the running system. In particular, due to the realm of modern technologies which are inherently dynamic, the problem becomes even more acute. For example, dynamic loading in Java may lead to references between classes that are dynamically determined (and thus cannot be statically detected); reflection can lead to complex logic that may stand behind each dependency; the execution of segments of code may well depend on environmental factors, etc. Another example is the composition of Structured Query Language (SQL) queries as strings that may depend on external data. The problem in understanding the dependency model is that we want to detect every link that may happen in any possible execution, while keeping the list as accurate as possible (i.e. not adding a link that may never happen). In addition, we want to focus on code sections that are responsible for a specific link, for example, identifying those statements in the code that perform certain method invocations which yield the subject link. This information is mandatory in "what-if" scenarios.

Present strategies for detecting dependencies utilize either complex static analysis techniques or are based on dynamic techniques which execute applications and infer the behavior and the dependencies from those runs. Strategies that are based on static analysis techniques are leveraging highly complex data and control flow, and there are cases where they will end-up detecting many false links due to the exponential nature of the problem. In addition, static analysis is limited by its nature, since it cannot infer dependencies that are driven by dynamic events (e.g., user input), or external resources (e.g., certain value kept in a database or property files that are external to the application code, classes may be loaded based on configuration files). On the other hand, engines that are based on dynamic analysis can have very high overhead since they require setting the runtime environment, and processing enough data to simulate all possible runs. Since dynamic engines infer only those links that are active during the executions of the application, dynamic analysis is generally not able to cover all possible links.

Therefore, there is a need for a more precise mechanism to detect dependencies without incurring the excessive overhead generally associated with comprehensive dynamic analysis. The mechanism should identify which code sections are prime candidates for further analysis, and should expend the range of dependencies that can be detected using current analysis techniques.

SUMMARY OF THE INVENTION

The present invention provides a solution to the prior art problems discussed hereinabove. The feedback directed dependency analysis mechanism of the present invention is operative to detect dependencies that would not be found by traditional static and dynamic analysis. Use of the present invention enables the identification of more accurate dependencies. Specifically it identifies dependencies that cannot be statically determined due to missing external information and were not observed dynamically at the particular executions of the application.

The present invention combines known static and dynamic analysis techniques to identify dependencies and overcome the limitations of each type of analysis when executed separately. Static analysis identifies the code sections that may participate in a dependency. Dynamic analysis is performed by executing the application and analyzing the logs to identify actual values used by the identified code sections. Finally, those values are fed to the static analysis engines to identify the relevant dependencies.

The present invention functions to discover dependencies between components of the application, including software modules, functions, and methods, and data components such as databases or specific tables or fields inside databases. A dependency exists between two components if a change in one component may require changing the other component. The important aspect of the invention is the mutual feedback between the static and dynamic analyses. The particular order in which they are applied is less critical.

In addition to identifying dependencies which could not be found by each separate analysis, the invention also enables the performing of only a minimal set of application executions (dynamic analysis) and then using static analysis to identify dependencies which were not executed during those executions. This is particularly useful as running all possible execution paths that are either not feasible or expensive and time consuming.

The mechanism of the invention is capable of operating at a relatively early stage in the development cycle. The mechanism operates on dependencies that exist at a stage in the design wherein the design is not finalized. Alternatively, the mechanism of the invention could be used at a late stage of the development cycle.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the invention, a first method of detecting one or more dependencies in a software application to be analyzed comprising the steps of first performing an initial static analysis on said software application to identify one or more sections of said software application which contain dynamic values which cannot be analyzed by said static analysis, second performing a dynamic analysis on said one or more sections to identify one or more dynamic values for sections identified by said step of first performing and third performing a subsequent static analysis utilizing said one or more dynamic values to identify said one or more dependencies.

The dependencies referenced in the first method described hereinabove comprise data dependencies. The dependencies referenced in the first method described hereinabove comprise control dependencies. The dynamic values referenced in the first method described hereinabove comprise user provided input. The dynamic values referenced in the first method described hereinabove comprise data stored external to said application. The sections referenced in the first method described hereinabove comprise variables. The sections referenced in the first method described hereinabove comprise fields. The sections referenced in the first method described hereinabove comprise parameters. The steps of second performing and third performing referenced in the first method described hereinabove are repeated one or more times if sections remain whose dependencies cannot be detected via said step of third performing.

There is also provided a second method of detecting one or more data or control dependencies in a software application to be analyzed comprising the steps of first performing a dynamic analysis on said software application to identify one or more dynamic values for sections in said software application which cannot be analyzed by static analysis and second performing a static analysis utilizing said dynamic values to identify one or more dependencies.

The dynamic values referenced in the second method described hereinabove comprise user provided input. The dynamic values referenced in the second method described hereinabove comprise data stored external to said application. The sections referenced in the second method described hereinabove comprise variables. The sections referenced in the second method described hereinabove comprise fields. The sections referenced in the second method described hereinabove comprise parameters. The steps of first performing and second performing referenced in the second method described hereinabove are repeated one or more times if sections remain whose dependencies cannot be detected via said step of second performing.

There is further provided a computer program product comprising a computer usable medium having computer usable program code for discovering one or more dependencies in a software application to be analyzed, including computer usable program code for first performing an initial static analysis on said software application to identify one or more sections of said software application which contain dynamic values which cannot be analyzed by said static analysis, computer usable program code for second performing a dynamic analysis on said one or more sections to identify one or more dynamic values for sections identified by said static analysis and computer usable program code for third performing a subsequent static analysis utilizing said one or more dynamic values to identify one or more dependencies. The dependencies referenced in the first method described hereinabove comprise data dependencies.

The dependencies referenced in the computer program product described hereinabove comprise control dependencies. The dynamic values referenced in the program product described hereinabove comprise user provided input. The dynamic values referenced in the program product described hereinabove comprise data stored external to said application. The sections referenced in the program product described hereinabove comprise variables. The sections referenced in the program product described hereinabove comprise fields. The sections referenced in the program product described hereinabove comprise parameters. The steps of second performing and third performing referenced in the program product described hereinabove are repeated one or more times if sections remain whose dependencies cannot be detected via said step of third performing.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ASIC | Application Specific Integrated Circuit |
| CD-ROM | Compact Disc Read Only Memory |
| CICS | Customer Information Control System |
| CPU | Central Processing Unit |
| DSP | Digital Signal Processor |
| EEROM | Electrically Erasable Read Only Memory |
| ERP | Enterprise Resource Planning |
| FPGA | Field Programmable Gate Array |
| FTP | File Transfer Protocol |
| HDL | Hardware Description Language |
| HTTP | Hyper-Text Transport Protocol |
| I/O | Input/Output |
| LAN | Local Area Network |
| NIC | Network Interface Card |
| RAM | Random Access Memory |
| ROM | Read Only Memory |
| SQL | Structured Query Language |
| WAN | Wide Area Network |
| WLAN | Wireless Local Area Network |

DETAILED DESCRIPTION OF THE INVENTION

The present invention is a novel and useful mechanism of combining static and dynamic analysis techniques. The feedback directed dependency analysis mechanism of the present invention is operative to detect dependencies that would not have been found by traditional static and dynamic analysis. Use of the present invention enables the identification of more accurate dependencies. Specifically, it identifies dependencies that cannot be statically determined due to missing external information and were not observed dynamically at the particular executions of the application.

The present invention combines static and dynamic analysis techniques well known in the art in order to identify dependencies and overcome the limitations of each type of analysis when executed separately. Static analysis identifies the code sections that constitute the dependency. Dynamic analysis is performed by executing the application and analyzing the logs to identify actual values required for further dependency analysis. Finally, those values are fed to the static analysis engines to identify the relevant dependencies.

This invention enables the more precise discovery of dependencies than cannot be found in static analysis, since static analysis does not have access to the dynamic values. The invention may still output spurious dependencies since dependencies are only discovered using static analysis, which is typically conservative and may report potential dependencies that do not happen in actual runs of the system being analyzed.

In addition to identifying dependencies which could not be found by each separate analysis, the invention also enables the performing of only a minimal set of application executions (dynamic analysis) and then using static analysis to identify dependencies which were not executed during those executions. This is particularly useful as running all possible execution paths in order to discover all dependencies is either not feasible or expensive and time consuming. The present invention employs dynamic analysis to find possible values for a limited set of program points identified by the preceding static analysis.

The present invention functions to discover dependencies between components of the application, including software modules, functions, and methods, and data components such as databases or specific tables or fields inside databases. A dependency exists between two components if a change in one may require changing the other. The important aspect of the invention is the mutual feedback between the static and dynamic analyses. The particular order in which they are applied is less critical.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In this document the terms external information and dynamic information refer to data which resides external to the application, and is used by the application (e.g., database file, keyboard input). The term dynamic values refer to the specific values (from the external information) used by an application during run-time. The term code section refers to an identified portion of a software application. The term link refers to a software application's interaction with either external data or code segment (e.g., function, method). The term "software application" is intended to refer to either an entire software application or one or more individual sections (or portions) of the software application.

Note that the invention can take the form of an entirely hardware embodiment, an entirely software/firmware embodiment or an embodiment containing both hardware and software/firmware elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Figure 1:
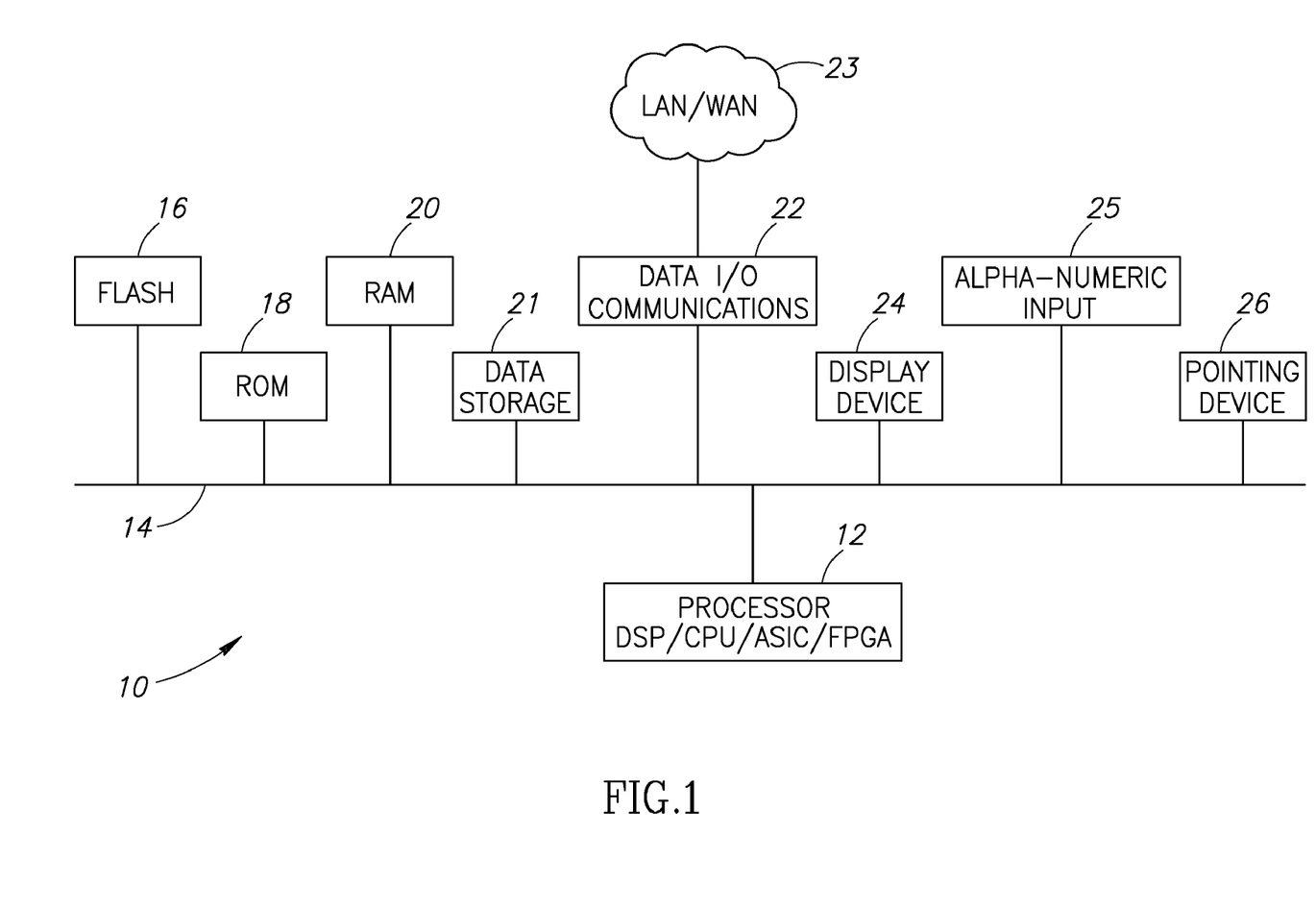
FIG. 1 is a block diagram illustrating an example computer processing system adapted to implement the feedback directed dependency analysis mechanism of the present invention.

A block diagram illustrating an example computer processing system adapted to implement the feedback directed dependency analysis mechanism of the present invention is shown in FIG. 1. The computer system, generally referenced 10, comprises a processor 12 which may comprise a digital signal processor (DSP), central processing unit (CPU), microcontroller, microprocessor, microcomputer, ASIC or FPGA core. The system also comprises static read only memory 18 and dynamic main memory 20 all in communication with the processor. The processor is also in communication, via bus 14, with a number of peripheral devices that are also included in the computer system. Peripheral devices coupled to the bus include a display device 24 (e.g., monitor), alpha-numeric input device 25 (e.g., keyboard) and pointing device 26 (e.g., mouse, tablet, etc.)

The computer system is connected to one or more external networks such as a LAN or WAN 23 via communication lines connected to the system via data I/O communications interface 22 (e.g., network interface card or NIC). The network adapters 22 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 21 for storing application programs and data. The system comprises computer readable storage medium that may include any suitable memory means, including but not limited to, magnetic storage, optical storage, semiconductor volatile or non-volatile memory, biological memory devices, or any other memory storage device.

Software adapted to implement the quality estimation mechanism is adapted to reside on a computer readable medium, such as a magnetic disk within a disk drive unit. Alternatively, the computer readable medium may comprise a floppy disk, removable hard disk, Flash memory 16, EEROM based memory, bubble memory storage, ROM storage, distribution media, intermediate storage media, execution memory of a computer, and any other medium or device capable of storing for later reading by a computer a computer program implementing the method of this invention. The software adapted to implement the quality estimation mechanism of the present invention may also reside, in whole or in part, in the static or dynamic main memories or in firmware within the processor of the computer system (i.e. within microcontroller, microprocessor or microcomputer internal memory).

Figure 2:
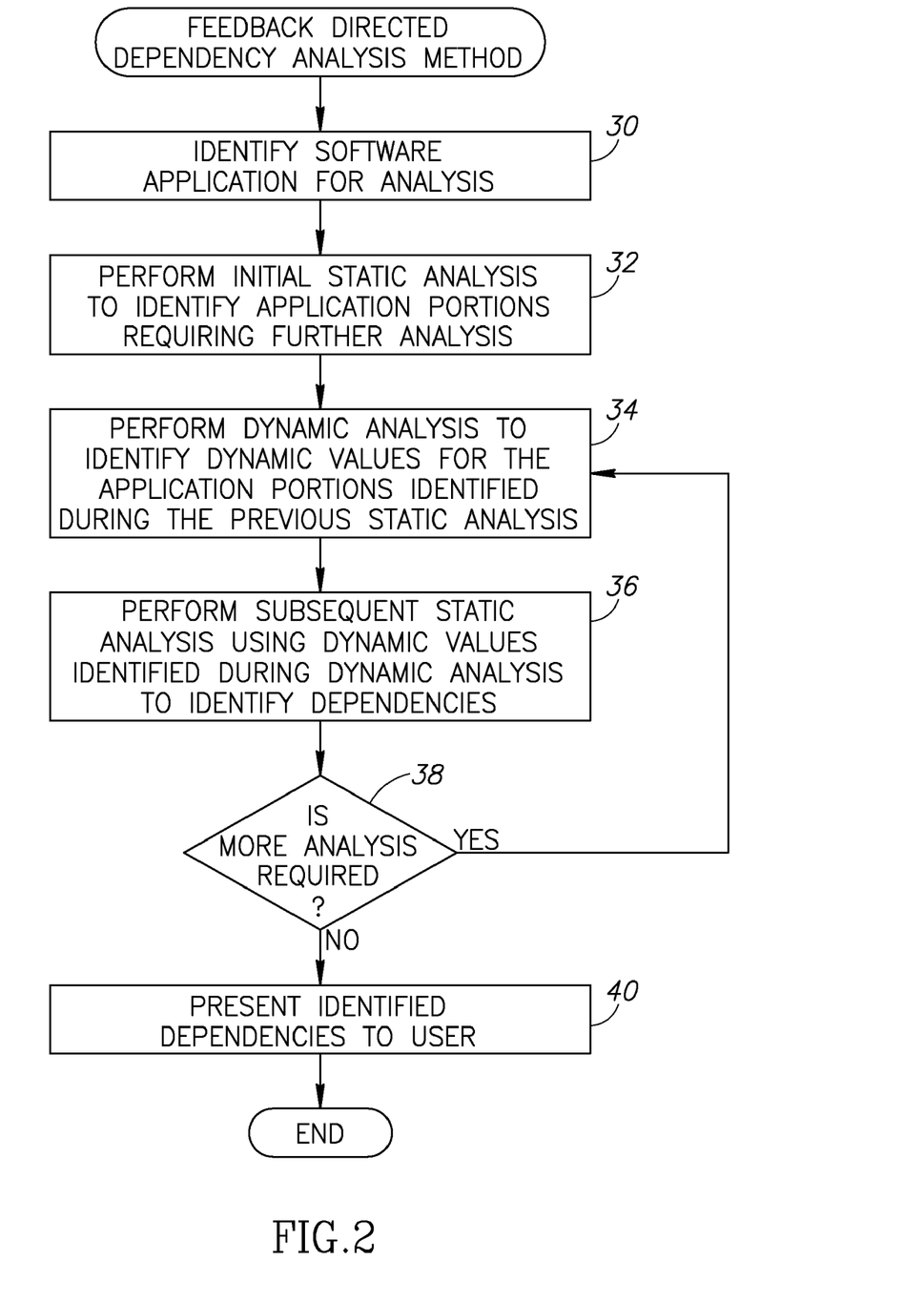
FIG. 2 is a flow diagram illustrating the method of implementing feedback directed dependency analysis of the present invention.

Other digital computer system configurations can also be employed to implement the quality estimation mechanism of the present invention, and to the extent that a particular system configuration is capable of implementing the system and methods of this invention, it is equivalent to the representative digital computer system of FIG. 2 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

Feedback Directed Dependency Analysis

In accordance with the invention, static analysis discovers missing values which are then found via dynamic analysis. These dynamic values found are then fed into a second static analysis, which discovers the actual dependencies. The present invention overcomes the limitations of finding dependencies solely through static engines or through dynamic engines or through a simple combination of the two approaches, as is the case with prior art systems. The invention detects dependencies that cannot be derived strictly through static code analysis, or by analyzing the results of certain runs of the application (i.e. dynamic analysis). The invention performs a limited number of runs of the application in order to discover information that will enable the discovery of many dependencies, including those that did not occur in those runs. The technique also detects links that cannot be identified by combining results driven from static engines with results that are identified from dynamic engines. Some correlation and feedback between static and dynamic engines need to be applied to reach the results of our technique.

Feedback is provided to a static analysis engine through dynamically retrieved values by identifying application sections (e.g., variables, fields, parameters, application program interface call sequence) in a software application and the resolution of possible object values which might constitute a dependency. For example, the ability to access a database or a message queue by resolving its name. Resolving values is important since many resources in the code are represented through names, which identify the exact resource that they stand for. For example, the database name that the program connects to is included in the string that creates the connection, and the table accessed in this database is included in the SQL code that is executed.

Static analysis is first used to identify the code sections that require dynamically observed values in order to increase the scope of discovered dependencies. Dynamic analysis then discovers dynamically observed values for the code identified by the initial static analysis. Finally, the dynamically observed values are input to a subsequent static value flow analysis in order to analyze the code sections identified by the initial static analysis.

A flow diagram illustrating the feedback directed dependency method is shown in FIG. 2. First the user identifies the software application to be analyzed (step 30). An initial static analysis is performed to determine which portions (e.g., variables) of the application require dynamic values in order to be analyzed more thoroughly (step 32). Dynamic analysis is then performed to find values from external sources for variables (or fields, parameters etc.) identified during previous static analysis (step 34). A subsequent static analysis is performed which uses the dynamic values from step 34 for the portions of the application that were identified in step 32 (step 36). If there are still any application portions (e.g., variables) that are missing values then more analysis is required (step 38), and the method returns to step 34 focusing on the application portions identified in step 36. Otherwise the discovered dependencies are presented to the user (step 40).

Figure 3:
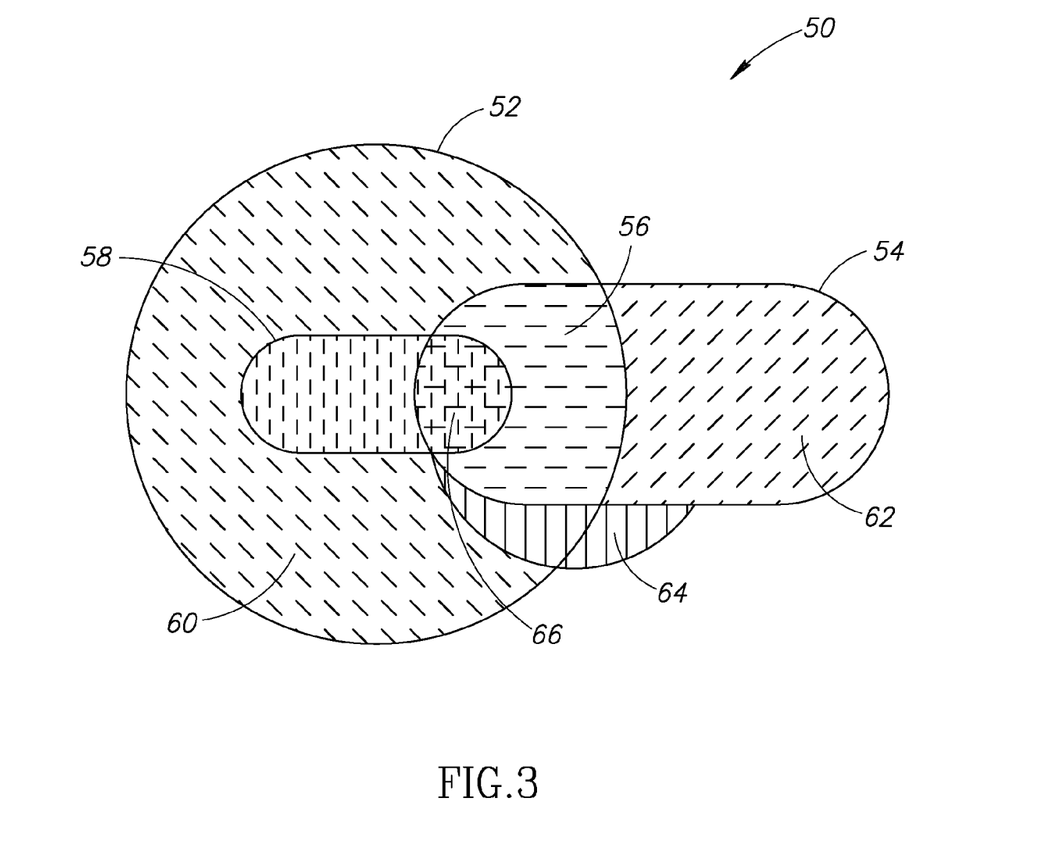
FIG. 3 is a diagram illustrating the scope of static and dynamic dependencies of the present invention.

A diagram example of dependencies discovered via the present invention is shown in FIG. 3. In the diagram generally referenced 50, region 52 represents the universe of all real dependencies. Region 54 (which includes regions 56, 62, and 66) represents the universe of dependencies that can be found by pure static analysis. Region 56 (the intersection of Region 52 and Region 54) represents all real dependencies that can be found by pure static analyzers. Region 58 represents all dependencies found by dynamic analyzers on a given test suite. Region 60 (Region 52 minus Region 58 minus Region 54) represents the dependencies that cannot be found by pure static analysis or by dynamic analysis on the given test suite. Region 62 represents spurious dependencies found by conservative static analysis. Finally, region 64 represents the additional dependencies that can be found by the invention.

Figure 4:
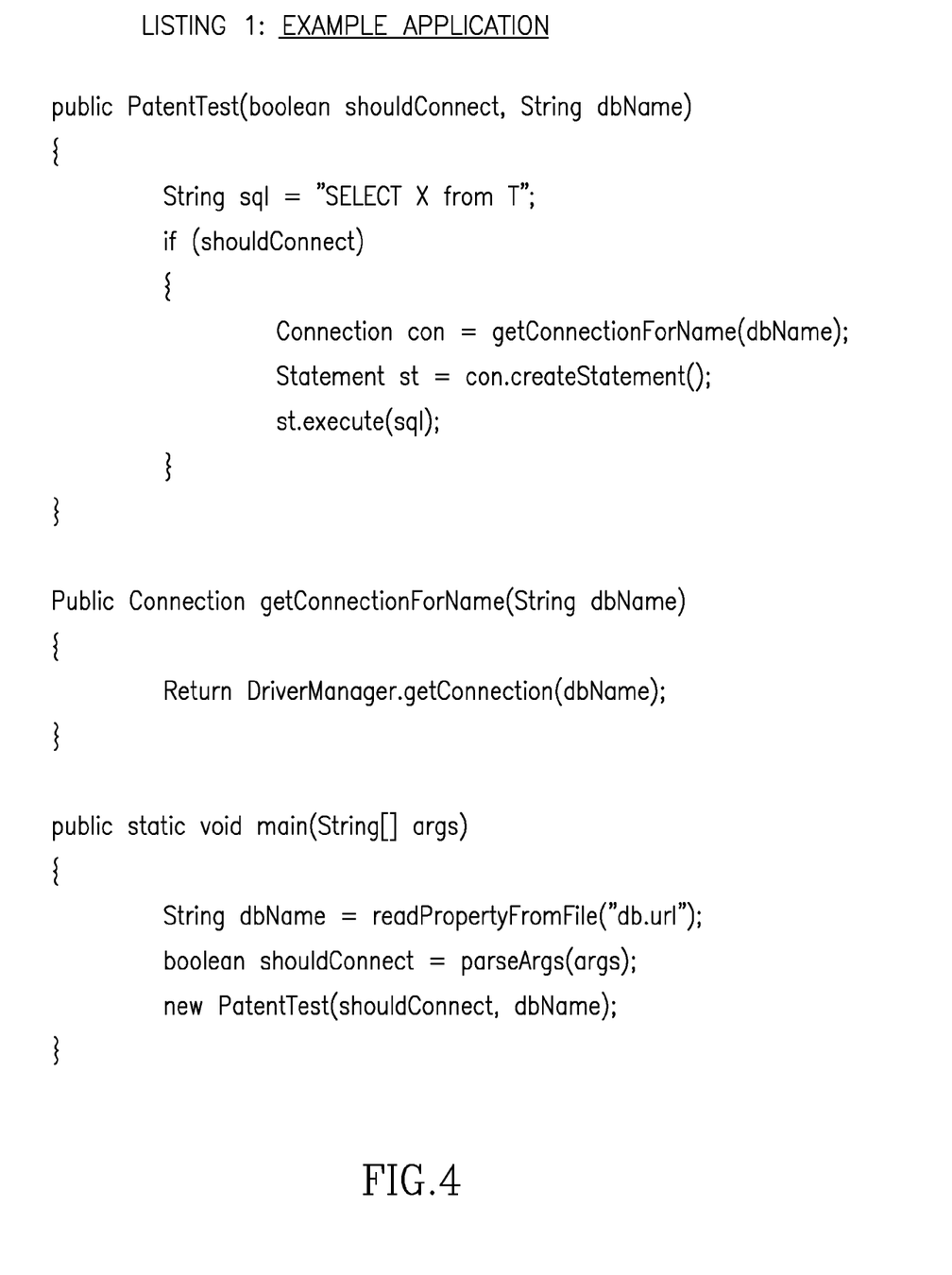
FIG. 4 is a listing for an example application illustrating the implementation of feedback directed dependency analysis of the present invention.

An example code analyzed by the present invention is shown in FIG. 4. The application example, generally referenced Listing 1, is a program to read values from a database table. An initial static analysis identifies that the database name is being read from file "db.url". This limits the scope of the initial static analysis since name of the database to be opened is not known. The dynamic analysis step identifies the database name stored in "db.url". If the parameter shouldConnect is TRUE when function PatentTest is called, then the dynamic analysis is able to analyze the SQL statement executed in function PatentTest. If shouldConnect is FALSE, then the block of code associated with if (shouldConnect) is not executed since shouldConnect is FALSE. Therefore there is no dynamic information about the SQL query at runtime. However, the subsequent static analysis step uses the database name identified in the dynamic analysis step in analyzing all of the source code comprising function PatentTest regardless of the Boolean value stored in parameter shouldConnect.

Figure 5:
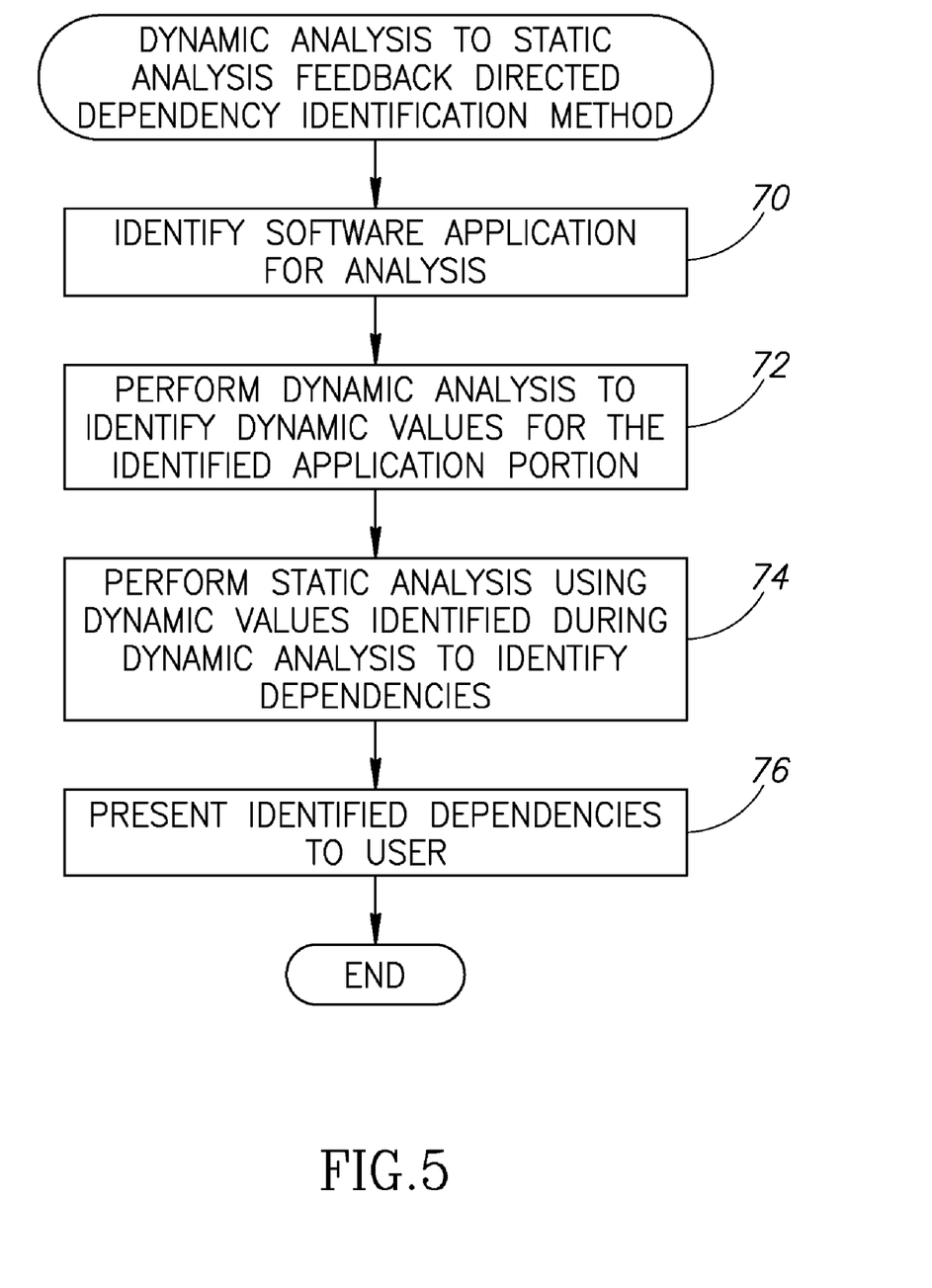
FIG. 5 is a flow diagram illustrating the method of feeding dynamic values resulting from dynamic analysis into static analysis in order to find dependencies.

There are instances when the user knows which portion of the code requires further analysis. For example, if a change is made to an external database system, the user can target the specific code which accesses the database. In this case, dynamic values will feed static analysis. A flow diagram illustrating the method to perform static analysis incorporating dynamic values is shown in FIG. 5. First the user identifies the software application for analysis (step 70). A dynamic analysis is then performed to identify dynamic values from the application portion identified in step 70 (step 72). Using the dynamic values discovered during the step 70 a static analysis is then performed (step 74). Finally, the discovered dependencies are presented to the user (step 76).

Figure 6:
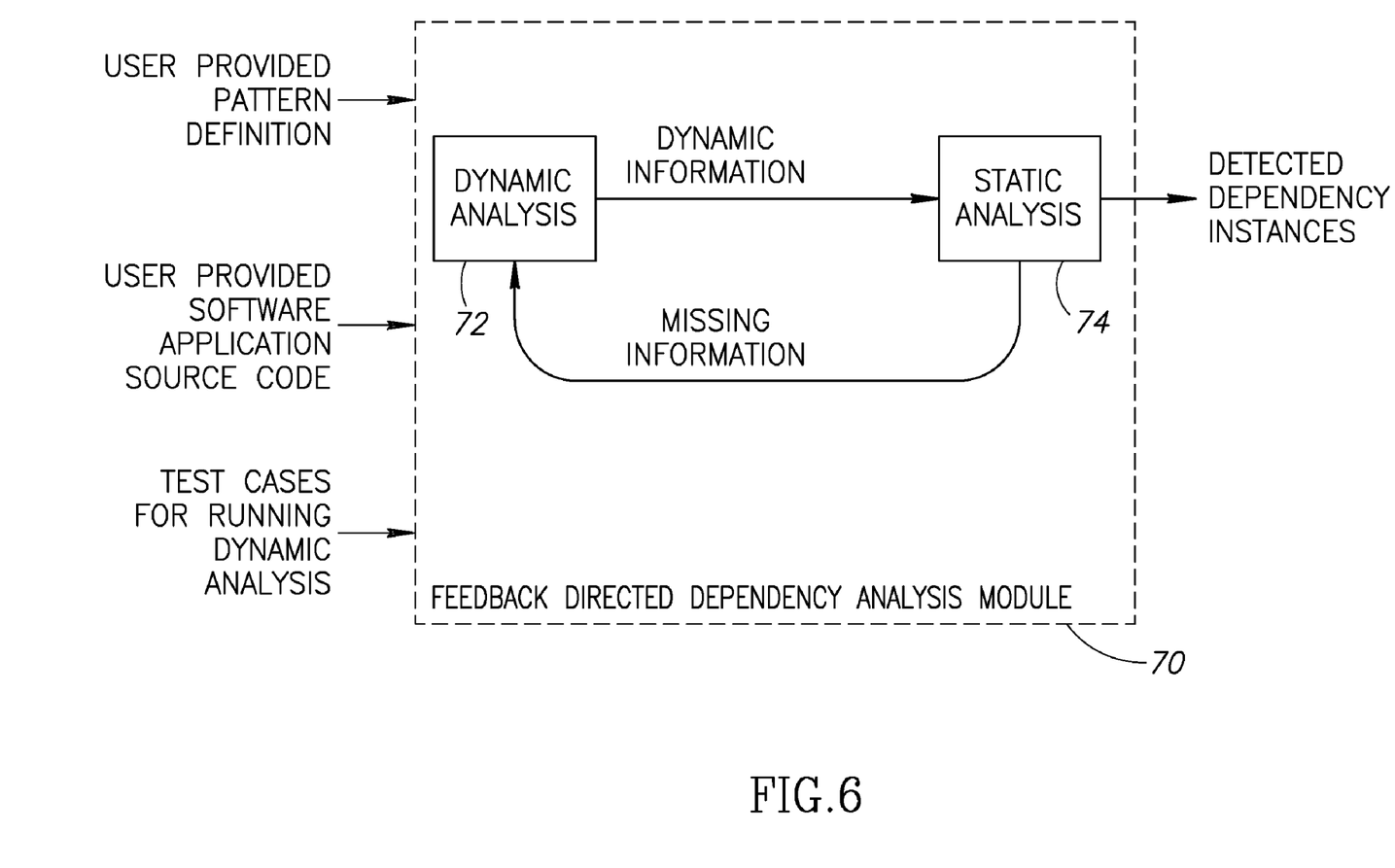
FIG. 6 is a block diagram illustrating an example computer processing system adapted to implement the feedback directed dependency analysis mechanism of the present invention.

A block diagram illustrating an example implementation of the feedback directed dependency analysis mechanism of the present invention is shown in FIG. 6. The analysis block diagram generally referenced 70 comprises dynamic analysis engine 72 and static analysis engine 74. In operation, the user defines the types of dependencies to be detected, specifies the software application to be analyzed and test cases to be run. Static analysis identifies missing values which are then fed to dynamic analysis engine 72. Dynamic analysis identifies dynamic information which is then fed into the static analysis engine 74. If there is no more missing dynamic information then no further analysis is necessary, and the resulting output from the static analysis engine is the detected dependency instances.

Figure 7:
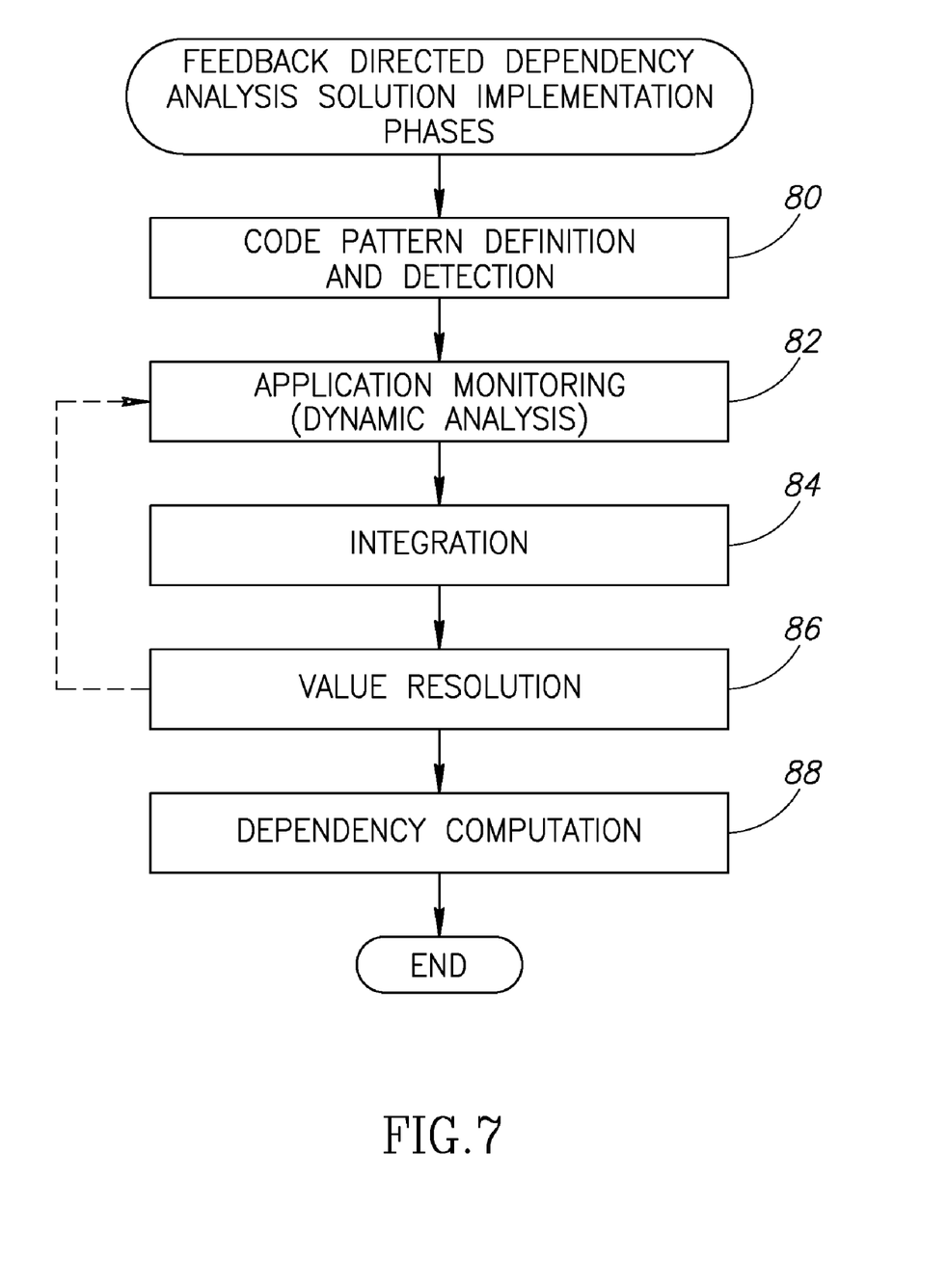
FIG. 7 is a flow diagram illustrating the solution implementation phases of the present invention.

A flow diagram illustrating the solution implementation phases of the current invention is shown in FIG. 7. The first phase is code pattern definition and detection (step 80) where the user defines the types of inter- and intra-dependencies to be detected. Each dependency is defined through a code pattern in which the method invocations that constitute the dependency and the relationships between them are specified. To illustrate, referring to the example in FIG. 4 discussed supra, the pattern would include the getConnection, createStatement and execute methods. In addition, a pattern specifies which variables (or parameters, return values, etc.) need to be resolved. In the example, we would be interested in the dbName parameter for the getConnection method and the sql parameter for the execute method. The user defines the correlation between the objects resolved in the pattern and the resource type that they represent (e.g., that a specific string represents a database name or message queue name). This defines a dependency between the code which includes the pattern's method invocations and the resource, in this case between the class which creates a statement and the database it accesses. In the above example, the user would specify that the String in the getConnection method represents a Database resource. This defines a dependency between the PatentTest class and the database name that is provided by the user and the table T in the database.

The code pattern definition and detection (i.e. the first) phase is the static analysis phase which detects all code sequences that obey the defined patterns by utilizing data and control flow analysis. The result is a set of detected pattern instances. In the example, the following source code lines are identified as pattern instances:

```
Statement st = con.createStatement( );
st.execute(sql);
return DriverManager.getConnection(dbName);
```

The second phase is application monitoring (step 82), which is the dynamic analysis phase. In this phase, the application is executed with a logging mechanism which logs method invocations of interest. Specifically, the application logs all the methods defined in the patterns and in addition, common methods used for manipulating external information. Additionally, all the values that are part of the method invocations are logged (e.g., parameter and return values). One way to achieve this is by instrumenting the code with logging statements. In the example, the main method and the getConnection, createStatement and execute methods would be monitored along with their parameters and return values. The third phase is integration (step 84). In this phase, the dynamic information resulting from application monitoring (i.e. dynamic analysis) is read and the runtime method invocations are correlated to the appropriate source code locations.

The fourth phase is value resolution (step 86). In this phase value flow analysis is performed on static and dynamic values (i.e. values that have been observed dynamically) in order to resolve values that should be resolved in the detected pattern instances. In the example the database name (through a dynamic value) and the SQL statement (through a static value) will be resolved. If there are still pattern instances which require dynamic values then the application monitoring (i.e. the second) phase is repeated. The fifth and final phase is dependency computation (step 88). In this phase each detected pattern instance defines one or several dependencies as identified by the user at the initial step of this process (i.e. code pattern definition). In the example the pattern instance defines a dependency between the PatentTest class and the database name included in dbName, the PatentTest class and table T of database dbName included in the SQL statement. The dependency also specifies which source code lines compose the dependency (i.e. the source code lines identified in the fourth phase).

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method executed by a computer processor of detecting one or more dependencies in a software application source code to be analyzed, said method comprising the steps of:
   first performing an initial static analysis on said software application source code to identify one or more code sections of said software application source code which contain dynamic values which cannot be analyzed by said initial static analysis alone;
   second performing a dynamic analysis on said one or more code sections to identify one or more dynamic values for said one or more code sections identified by said initial static analysis;
   third performing a subsequent static analysis utilizing said one or more dynamic values identified by said dynamic analysis to identify said one or more dependencies in said source code; and
   presenting said one or more identified dependencies to a user.

2. The method according to claim 1, wherein said one or more dependencies comprise one or more data dependencies.

3. The method according to claim 1, wherein said one or more dependencies comprise one or more control dependencies.

4. The method according to claim 1, wherein said dynamic values comprises user provided input.

5. The method according to claim 1, wherein said dynamic values comprises data stored external to said application.

6. The method according to claim 1, wherein said one or more sections comprise one or more variables.

7. The method according to claim 1, wherein said one or more sections comprise one or more parameters.

8. The method according to claim 1, wherein said one or more sections comprise one or more fields.

9. The method according to claim 1, wherein said steps of second performing and third performing are repeated one or more times if sections remain whose dependencies cannot be detected via said step of third performing.

10. A method executed by a computer processor of detecting one or more data or control dependencies in a software application source code to be analyzed, said method comprising the steps of:
    first performing a first static analysis on said software application source code to identify code sections that require dynamically observed values thereby increasing the scope of discovered dependencies;
    second performing a dynamic analysis on said software application source code using the results of said first static analysis to identify one or more dynamically observed values for code sections in said software application source code identified by said first static analysis;
    third performing a second static analysis utilizing the results of said dynamic analysis to identify one or more dependencies in code sections identified by said first static analysis; and
    presenting said one or more identified dependencies to a user.

11. The method according to claim 10, wherein said dynamic values comprises user provided input.

12. The method according to claim 10, wherein said dynamic values comprises data stored external to said application.

13. The method according to claim 10, wherein said one or more sections comprise one or more variables.

14. The method according to claim 10, wherein said one or more sections comprise one or more parameters.

15. The method according to claim 10, wherein said one or more sections comprise one or more fields.

16. The method according to claim 10, wherein said steps of first performing, second performing and third performing are repeated one or more times if sections remain whose dependencies cannot be detected via said step of second performing.

17. A computer program product, comprising:
    a non-transitory computer usable medium storing computer usable program code for discovering one or more dependencies in a software application source code to be analyzed, said computer program product including:
    computer usable program code for first performing an initial static analysis on said software application source code to identify one or more code sections of said software application source code which contain dynamic values which cannot be analyzed by said initial static analysis alone;
    computer usable program code for second performing a dynamic analysis on said one or more code sections to identify one or more dynamic values for said one or more code sections identified by said initial static analysis;
    computer usable program code for third performing a subsequent static analysis utilizing said one or more dynamic values identified by said dynamic analysis to identify one or more dependencies in code sections identified by said initial static analysis; and
    computer usable program code for presenting said one or more identified dependencies to a user.

18. The computer program product according to claim 17, wherein said one or more dependencies comprise one or more data dependencies.

19. The computer program product according to claim 17, wherein said one or more dependencies comprise one or more control dependencies.

20. The computer program product according to claim 17, wherein said dynamic values comprises user provided input.

21. The computer program product according to claim 17, wherein said dynamic values comprises data stored external to said application.

22. The computer program product according to claim 17, wherein said one or more sections comprise one or more variables.

23. The computer program product according to claim 17, wherein said one or more section comprise one or more parameters.

24. The computer program product according to claim 17, wherein said one or more section comprise one or more fields.

25. The computer program product according to claim 17, wherein said steps of second performing and third performing are repeated one or more times if sections remain whose dependencies cannot be detected via said step of third performing.

* * * * *